United States Patent Office 2,994,699
Patented Aug. 1, 1961

2,994,699
KETONIC QUATERNARY AMMONIUM COMPOUNDS
Peter L. de Benneville, Philadelphia, Pa., assignor to Rohm & Haas Company, Philadelphia, Pa., a corporation of Delaware
No Drawing. Filed Jan. 29, 1959, Ser. No. 789,789
8 Claims. (Cl. 260—294.7)

This invention deals with specific ketonic quaternary ammonium compounds.

The compounds of this invention may be represented by the following formula:

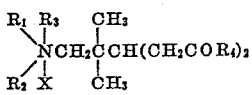

in which $R_1$ and $R_2$, taken individually, represent alkyl groups of not over four carbon atoms and, taken collectively, represent a divalent saturated aliphatic chain of four to five carbon atoms which jointly with the amino nitrogen atom forms a five- to six-sided heteromonocyclic amine.

The symbol $R_3$ may represent an alkyl, including cycloalkyl, group of one to eighteen carbon atoms, an alkenyl group of three to eighteen carbon atoms, an alkynyl group of three to eighteen carbon atoms, an alkoxyalkyl or alkenoxyalkyl group of three to twenty carbon atoms in which the alkoxy group or alkenoxy group is no closer than the beta position with respect to the amino nitrogen atom, a hydroxyalkyl group of two to eighteen carbon atoms in which the hydroxy group is no closer than the beta position with respect to the amino nitrogen atom, an alkoxyarylalkyl, aryloxyalkyl, or alkylaryloxyalkyl group of no more than twenty carbon atoms, an arylalkyl, alkylarylalkyl, or arylalkenyl group of seven to twenty carbon atoms, arylalkyl groups having halogen or nitrogen substituents, a carbamoylalkyl group of two to eighteen carbon atoms, an alkoxycarbonylalkyl group of three to twenty-four carbon atoms, and an alkylcarbonylalkyl or arylcarbonylalkyl group of three to twenty-four carbon atoms. The aryl group of $R_3$ may have substituent groups thereon including one or more cyano, nitro, alkoxy, alkyl, chloro, or bromo groups.

The symbol $R_4$ stands for an aryl or substituted aryl group of six to about twelve carbon atoms.

The alkyl groups of $R_1$, $R_2$, $R_3$, and $R_4$, the alkenyl groups of $R_3$ and $R_4$, and the alkynyl groups of $R_3$ may be a straight or branched chain in any of the known spatial configurations. The substituents on the cyclic structures of $R_3$ and $R_4$ may occupy any of the possible ring locations. While, of course, some spatial structures and ring positions are preferred over others, all possible configurations and structures are satisfactory for the present purposes.

X represents a reactive anion. In this respect there may be used chloride, bromide, iodide, sulfate, methosulfate, phosphate, acetate, lactate, hydroxide, tartrate, thiocyanate, nitrate, pentachlorophenate, and the like. The halogens having an atomic weight of about 35.5 to 127 are preferred. Anions other than the halogens or the hydroxide may be supplied directly or by metathesis with the halide or hydroxide form of the present quaternary ammonium compounds. An anion exchange resin may also be used to supply the desired ion.

Typical of the groups that $R_3$ may represent include methyl, ethyl, propyl, butyl, pentyl, hexyl, octyl, nonyl, decyl, dodecyl, pentadecyl, octadecyl; allyl, butenyl, pentenyl, hexenyl, octenyl, decenyl, dodecenyl, tetradecenyl, octadecenyl, propynyl, butynyl, pentynyl, hexynyl, octynyl, decynyl, dodecynyl, octadecynyl; methoxyethyl, methoxybutyl, methoxypentyl, methoxyoctyl, methoxydecyl, methoxydodecyl, methoxyoctadecyl, ethoxyethyl, ethoxypropyl, ethoxyhexyl, ethoxynonyl, ethoxydecyl, ethoxytetradecyl, ethoxyoctadecyl, propoxyethyl, propoxypropyl, propoxyheptyl, propoxydecyl, propoxytetradecyl, propoxyheptadecyl, butoxyethyl, butoxybutyl, butoxyoctyl, butoxyundecyl, butoxyhexadecyl, pentoxyethyl, pentoxypentyl, pentoxyhexyl, pentoxypentadecyl, hexoxyethyl, hexoxybutyl, hexoxyhexyl, hexoxydodecyl, hexoxytetradecyl, heptoxyethyl, heptoxyheptyl, heptoxydodecyl, octoxyethyl, octoxypropyl, octoxybutyl, octoxyoctyl, octoxydecyl, monoxyethyl, nonoxypentyl, nonoxynonyl, nonoxydecyl, decoxyethyl, decoxypropyl, decoxypentyl, decoxydecyl, undecoxyethyl, undecoxyheptyl, dodecoxyethyl, dodecoxypentyl, dodecoxyoctyl, tridecoxyethyl, tridecoxyheptyl, tetradecoxyethyl, tetradecoxybutyl, pentadecoxyethyl, pentadecoxypentyl, hexadecoxyethyl, heptadecoxyethyl, octadecoxyethyl, vinoxyethyl, vinoxybutyl, vinoxyoctyl, vinoxydecyl, vinoxydodecyl, vinoxyoctadecyl, alloxyethyl, alloxypropyl, alloxynonyl, alloxytetradecyl, butenoxyethyl, butenoxypentyl, butenoxyheptyl, butenoxyundecyl, butenoxytetradecyl, pentenoxyethyl, pentenoxypentyl, pentenoxydodecyl, pentenoxytridecyl, hexenoxyethyl, hexenoxyhexyl, hexenoxynonyl, hexenoxytetradecyl, nonenoxyethyl, nonenoxypentyl, nonenoxyhexyl, nonenoxynonyl, decenoxyethyl, decenoxyoctyl, undecenoxyethyl, undecenoxyoctyl, dodecenoxyethyl, dodecenoxypentyl, tridecenoxyethyl, tridecenoxyheptyl, tetradecenoxyethyl, tetradecenoxybutyl, pentadecenoxyethyl, pentadecenoxypentyl, hexadecenoxyethyl, heptadecenoxyethyl, octadecenoxyethyl; hydroxyethyl, hydroxypropyl, hydroxybutyl, hydroxypentyl, hydroxyoctyl, hedroxdecyl, hydroxydodecyl, hydroxyoctadecyl; benzyl, butylbenzyl, octylbenzyl, dodecylbenzyl, dimethylbenzyl, methylbutylbenzyl, dihexylbenzyl, phenylethyl, butylphenylethyl, phenylbutyl, phenyldodecyl, naphthylethyl, naphthylbutyl, naphthyloctyl, phenylbutenyl, phenyloctenyl, phenyldecenyl, phenyldodecenyl, octylphenylbutenyl; chlorobenzyl, dichlorobenzyl, bromobenzyl, cyanobenzyl, nitrobenzyl; methoxybenzyl, butoxybenzyl, octoxybenzyl, phenoxyethyl, octylphenoxyethyl, octylphenoxybutyl, methoxycarbonylmethyl, methoxycarbonylbutyl, methoxycarbonyldecyl, methoxycarbonyloctadecyl, ethoxycarbonylmethyl, ethoxycarbonyloctyl, ethoxycarbonyldecyl, ethoxycarbonylundecyl, propoxycarbonylmethyl, propoxycarbonylpropyl, propoxycarbonyloctyl, butoxycarbonylpentyl, butoxycarbonyldodecyl, pentoxycarbonylbutyl, pentoxycarbonyltetradecyl, hexoxycarbonylnonyl, hexoxycarbonyldodecyl, heptoxycarbonylethyl, heptoxycarbonyltridecyl, octoxycarbonylmethyl, octoxycarbonyloctyl, octoxycarbonylhexadecyl, nonoxycarbonylmethyl, decoxycarbonylmethyl, decoxycarbonylbutyl, decoxycarbonylhexyl, undecoxycarbonylbutyl, dodecoxycarbonylmethyl, dodecoxycarbonylnonyl, tridecoxycarbonylmethyl, tetradecoxycarbonylmethyl, hexadecoxycarbonylethyl, octadecoxycarbonylmethyl, octadecoxycarbonylpentyl; carbamoylmethyl, carbamoylethyl, carbamoylpropyl, carbamoylbutyl, carbamoyloctyl, carbamoyldodecyl, carbamoylheptadecyl, methylcarbonylmethyl, methylcarbonylethyl, methylcarbonylbutyl, methylcarbonyloctyl, methylcarbonyldecyl, methylcarbonyldodecyl, methylcarbonyloctadecyl, ethylcarbonylmethyl, ethylcarbonylethyl, ethylcarbonylbutyl, ethylcarbonylheptyl, ethylcarbonylnonyl, ethylcarbonyltetradecyl, ethylcarbonyloctadecyl, propylcarbonylmethyl, propylcarbonylpropyl, propylcarbonylpentyl, propylcarbonylundecyl, propycarbonylheptadecyl, butylcarbonylmethyl, butylcarbonylbutyl, butylcarbonylhexyl, butylcarbonyltridecyl, butylcarbonyloctadecyl, pentylcarbonylmethyl, pentylcarbonylpentyl, pentylcarbonyldodecyl, hexylcarbonylmethyl, hexylcarbonylhexyl, hexylcarbonyldecyl, hexylcarbonylpentadecyl, heptacarbonylmethyl, heptylcarbonylheptyl, heptylcarbonylhexadecyl, octylcarbonylmethyl, octylcarbonyloctyl, octylcarbonylpentadecyl, nonylcarbonylmethyl, nonylcarbonylpentyl, nonylcarbonylnonyl, nonylcarbonyltetradecyl, decylcarbonylmethyl, decylcarbonyltridecyl, undecylcarbonylmethyl, undecylcarbonyldecyl, dodecylcarbonylmethyl, dodecylcarbonylundecyl, tridecylcarbonylmethyl, tetradecylcarbonylethyl, pentadecylcarbonylpropyl, hexadecylcarbonylheptyl, heptadecylcarbonylbutyl, octadecylcarbonylethyl, phenylcarbonylmethyl, phenylcarbonylethyl, phenylcarbonylpropyl, phenylcarbonylbutyl, phenylcarbonyloctyl, phenylcarbonyldecyl, phenylcarbonyldodecyl, phenylcarbonyltetradecyl, phenylcarbonylheptadecyl, naphthylcarbonylmethyl, naphthylcarbonylethyl, naphthylcarbonylpentyl, naphthylcarbonyloctyl, naphthylcarbonyldodecyl, naphthylcarbonyltridecyl, butylphenylcarbonyloctyl, ethylnapthylcarbonylhexyl, and octylphenylcarbonylpentyl.

Typical groups that $R_4$ may represent include phenyl, chlorophenyl, dichlorophenyl, trichlorophenyl, dibromophenyl, tolyl, xylyl, trimethylphenyl, ethylphenyl, diethylphenyl, triethylphenyl, methylethylphenyl, butylphenyl, butenylphenyl, butoxyphenyl, naphthyl, methylnaphthyl, dimethylnaphthyl, ethylnapthyl, chloronaphthyl, dicloronaphthyl, and bromonaphthyl.

$R_1$ and $R_2$, taken singly, may represent methyl, ethyl, propyl, or butyl groups, in which instances $R_1$ and $R_2$ may be the same or different. $R_1$ and $R_2$, taken together and in conjunction with the amino nitrogen atom, may stand for a morpholino, thiamorpholino, pyrrolidinyl, or piperidino group, and these groups having one or more lower alkyl substituents, such as methyl and ethyl groups.

The compounds of this invention are produced by bringing together at a reacting temperature and thereby effecting quaternization a compound having the formula $R_3X$ with a compound having the formula

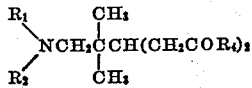

Typical representations of the $R_3X$ reactants, illustrated in chloride form, include octyl chloride, butenyl chloride, hexynyl chloride, ethoxydecyl chloride, vinoxyethyl chloride, hydroxyethyl chloride, benzyl chloride, phenylbutenyl chloride, butylphenylethyl chloride, methoxybenzyl chloride, octylphenoxyethyl chloride, cyanobenzyl chloride, bromobenzyl chloride, nitrobenzyl chloride, methyl chloroacetate, benzyl chloropropionate, chlorobutanamide, chloromethyl methyl ketone, and chlorodecyl phenyl ketone.

Typical representations of the ketonic reactants include 1,1-di(p-ethoxybenzoylmethyl)-2,2-dimethyl-3-piperidinopropane,
1,1-di(p-butylbenzoylmethyl)-2,2-dimethyl-3-pyrrolidinylpropane,
1,1-di(benzoylmethyl)-2-(dimethylaminomethyl)-2-methylpropane, and
1,1-di-(benzoylmethyl)-2-(morpholinomethyl)-2-methylpropane,
1,1-di(β-naphthoylmethyl)-2,2-dimethyl-3-dimethylaminopropane,
1,1-di(p-chlorobenzoylmethyl)-2-(dimethylaminomethyl)-2-methylpropane,
1,1-di(octylbenzoylmethyl)-2-(morpholinomethyl)-2-methylpropane.

The reactants $R_3X$ are compounds that are known or readily prepared by known methods.

The ketonic reactants are made by reacting a compound having the formula $CH_3COR_4$ with an aldehydic compound having the formula

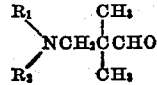

in the proportion of two of the former to one of the latter.

The production of the ketonic reactants is conducted in the temperature range of about 0° C. to the reflux temperature of the reaction mixture, in the presence of an inert, volatile, organic solvent, such as butanol, ether, and the like, and in the presence of a strong alkaline catalyst, such as sodium, potassium ethoxide, and the like.

The quaternary ammonium compounds of this invention are prepared by bringing together the selected reactants at a reacting temperature in the range of about 20° C. to the reflux temperature of the reaction mixture, preferably not above 200° C. The preferred range is about 50° to 120° C.

The use of an inert volatile organic solvent is frequently advantageous, particularly if the ketonic reactant is a solid. If both of the reactants of this invention are liquids the advantage of using a solvent is minimized. Suitable as a solvent are ethanol, isopropanol, tert-butanol, diethyl ether, acetonitrile, formamide, dioxane, nitromethane, ethylene glycol, toluene, heptane, and the like.

Reaction times of about two to twenty-four hours and more are generally employed depending largely on the reaction temperature, use and identity of a solvent, and the particular reactants employed. The time of reaction is not critical but merely influences the yield. As will be apparent to one skilled in the art, the longer reaction times generally favor higher yields, up to a point. Also, some reactants combine more speedily than others. In order to assure completeness of reaction and concomitant substantially quantitative results, if desired, there may be determined the amount of ionizable anion, particularly when halide is involved. When the theoretical amount of anion is present the reaction is complete.

The reactants of this invention combine in substantially equimolecular amounts to form the quaternary ammonium products of this invention in substantially quantitative amounts. Either reactant may be employed in excess, if desired. It is preferable to employ an excess of $R_3X$ if one reactant is desired in excess. At the conclusion of the reaction, any solvent used is removed by stripping, preferably under reduced pressure. Any excess reactant may be removed by extraction, such as with heptane, octane, or the like, from the reaction mixture or a water solution thereof.

It is possible, and frequently advantageous, in the preparation of some of the instant compounds to first prepare the halide form, such as chloride, in a manner already set forth, and then prepare any other desired form within the present definition by metathesis or ion exchange methods. For instance, any of the present compounds in halide form may be converted to the hydroxide form through the use of silver oxide, or the like, and then converted to any desired anion form by acidifying with an acid of choice such as sulfuric, phosphoric, acetic, and others within the range and spirit of this invention. As an alternative, an anion-exchange resin may be employed. Any of the present compounds, in halide or hydroxide form, may be converted to any desired anion form through the use of an anion-exchange resin in the desired anion form. For instance, there may be used an insoluble, cross-linked, styrene-divinylbenzene copolymeric quaternary ammonium salt in its sulfate, phosphate, or the like, form to convert a present compound in halide or hydroxide form to a desired form, such as sulfate, phosphate, and the like.

The products are white to yellow, viscous liquids or crystalline solids that are useful as bastericides, fungicides, plant growth regulators, and rodent repellents.

The present compounds are effective bactericides particularly when applied against *Micrococcus pyrogenes* var. *aureus* and *Salmonella typhosa* as determined by standard phenol coefficient tests. The instant compounds are useful fungicides in dilutions down to one-half ounce in 100 gallons of formulation and lower, particularly when applied against *Stemphylium sarcinaeforme* and *Monilinia fructicola*.

The compuonds of this invention are valuable as detergent-sanitizers and may be employed in meat plants to sanitize cutting tables, grinders, and the like, in fruit processing operations, for instance, to wash and sanitize lemons, oranges, and grapefruit, and in dairy farms to sanitize dairy equipment and utensils.

A suitable detergent-sanitizer formulation for use in meat plants includes, by weight, 5% of a compound of this invention, 2.5 to 5.0% of octylphenoxypolyethoxyethanol, 20 to 40% soda ash, 20 to 40% sodium metasilicate, and the remainder sodium tripolyphosphate. One ounce of this formulation is used per gallon of water. For sanitizing citrus fruit there is preferably used one part of a present compound in 5000 parts of water. For use in dairy farms, there may be used 10% of a quaternary ammonium compound of this invention, 10% of octylphenoxypolyethoxyethanol, 7% of trisodium phosphate, and 73% of water. One ounce of this solution is used per four gallons of water. The instant compounds in aqueous solution in amounts of about 0.5 to one ounce to one hundred pounds of dry fabric, are excellent as a final diaper rinse to prevent diaper rash. These compounds are also excellent premise sanitizers where they may be employed in concentrations of about 0.1 to 2.0% in aqueous cleaning solutions.

The compounds of this invention are valuable rodent repellents. In standard rodent repellency tests the present compounds consistently gave index values of greater than 90 up to over 97.

The compounds of this invention are valuable as highly selective plant growth regulators. As indicated by the standard Lanolin Ring Method, in which a lanolin paste containing 1% of a compound of this invention is employed, and Coated Sand Method, in which 32 mg. of a present compound is used to coat 20 g. of quartz sand in which the test seeds are planted, the present compounds are excellent herbicides for dicotyledonous plants while not substantially interfering with the growth of monocotyledonous plants. In many instances the present compounds completely inhibit dicotyledonous plants and in all other cases cause considerable damage on the dioctyledonous plant life whose inhibition is desired. This unusual selective herbicidal activity permits the use of the present compounds in many situations not available to many known commercial preparations. While all of the present compounds are valuable as selective heribicides, a particularly outstanding performer is the compound having the formula

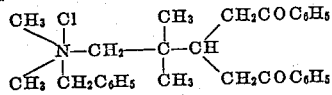

The compounds of this invention may be used as herbicides in any of the usual ways of distribution. They may be employed in dusts, wettable powreds, self-dispersible concentrates, solutions, or suspensions. Compositions suitable as dusts are prepared from a compound or compounds of the present invention dispersed in a solid carrier such as talc, clays, pyrophillite, diatomaceous earths, or mixtures thereof by grinding the components together or by depositing the subject compound on the solid carrier from a volatile solvent and evaporating the solvent, if desired. The subject compound is preferably present in the range of one-half to 25%, which is the most effective heribicidal range, when used in a dusting composition. A small amount of a suitable wetting and/ or sticking agent may be employed, if desired, such as a condensate of polyglycerol and a long chain fatty acid, with or without reaction with phthalic anhydride.

Compositions suitable as wettable powders are prepared from a compound or compounds of the instant invention, usually present in the range of about 25 to 90%, mixed with about 1 to 5% of a suitable wetting agent such as a water-soluble, surface-active alkylphenoxypolyethoxyethanol, a condensate of ethylene oxide and oleic acid or tall oil fatty acid or rosin acid, a condensate of ethylene oxide and long-chained mercaptans, sodium dodecyl sulfate, or sodium alkylbenzenesulfonates and about one-half to 3% of a suitable dispersing agent, such as a soluble salt of a copolymer of maleic anhydride and an unsaturated hydrocarbon such as styrene or octene, a formaldehyde-condensed naphthalene sulfonate, or a lignin sulfonate. This mixture is then formulated with a sufficient amount of a solid carrier, of the kinds set forth above, to make 100%. Such a wettable powder may be suspended in an aqueous medium and applied in a spray. The active compound is preferably present in the final formulation in the range of about 0.02 to 0.5%, which is the most effective herbicidal range.

Compositions suitable as self-emulsifiable or self-dispersible concentrates are prepared from a compound or compounds of this invention, usually present in a range of about 25 to 98%, mixed with about 1 to 25% of a suitable emulsifying agent, such as a water-soluble, surface-active addition product of ethylene oxide and methylene bisdiamylphenol, octylphenoxypolyethoxyethanol, polyglycerol oleic acid condensates, or sorbitan laurate or mixtures thereof. If desired, a suitable dispersing agent, such as a soluble salt of a copolymer of a maleic anhydride and an unsaturated hydrocarbon such as styrene or nonene, a formaldehyde-condensed naphthalene sulfonate, or a lignin sulfonate, may be employed in an amount of about one-half to 3%. Also, if desired, an inert organic solvent for the instant compound, the wetting agent, and the emulsifying agent, such as an aromatic naphtha, xylene, solvent esters, etc., may be employed usually in the amount of about 3 to 70%. There may similarly be used water-miscible solvent such as acetone or methyl ethyl ketone or dioxane. This concentrate is then added to a suitable medium, such as water, where it becomes emulsified or suspended without the necessity of the inclusion of additional agents. The instant compound is preferably present in the final formulation in the range of about 0.01 to 0.5% which is the most practical herbicidal range.

For greatest ease of application and maximum distribution effects, it is desirable that the present compounds be used in an aqueous spray. Another method of preparing a spray includes adding the desired amount of one of the present compounds, taken up in about 5% of a suitable solvent such as acetone, to water containing about 2% of a suitable wetting agent such as those previously listed. Sufficient compound should be added to assure the application of about one-eighth to one pound of the compound in a sufficient quantity by aqueous solution for application to one acre. Conveniently, spray is applied at about 40 gallons per acre, so the proper amount of compound to be added can be easily calculated.

Specific formulations that have been found to be highly satisfactory include the following, in which parts by weight are shown.

DUST 22.79 parts—clays,
2.21 parts—a compound of this invention.

WETTABLE POWDER 84.3 parts—a compound of this invention,
2 parts—water-soluble, surface-active alkylphenoxypolyethoxyethanol,
1 part—soluble salt of a copolymer of maleic anhydride and octene,
12.7 parts—clays.

This wettable powder, in the amount of 1.33 pounds, is added to 40 gallons of water for a one-acre application.

CONCENTRATES 97 parts—a compound of this invention,
2 parts—water-soluble, surface-active alkylphenoxypolyethoxyethanol,
1 part—soluble salt of a copolymer of maleic anhydride and octene.

This concentrate, in the amount of 1.16 pounds, is then added to 40 gallons of water for a one-acre application.

The compounds of this invention are useful herbicides when employed in either a pre-emergence or post-emergence application, as desired. The post-emergence application produces somewhat better control and is, therefore, the recommended procedure.

The compounds of this invention as well as their method of preparation may be more fully understood from the following examples which are offered by way of illustration and not by way of limitation and in which parts by weight are used throughout.

Example 1

When 67 parts of 1,1-di(benzoylmethyl)-2-(morpholinomethyl)-2-methylpropane, a white solid, are combined with 27.5 parts of 4-chlorobenzyl bromide, in 40 parts of isopropyl alcohol, and the whole is refluxed for 15 hours, there is obtained a colorless crystalline solid soluble in water, and corresponding by analysis to the formula $$\left[\begin{array}{c}O\diagdown\begin{array}{c}CH_2CH_2\\CH_2CH_2\end{array}\diagup NCH_2C(CH_3)_2CH(CH_2COC_6H_5)_2\\ \phantom{O\diagdown}CH_2\text{—}\phantom{X}\text{—}X\end{array}\right]Br$$

where X is chlorine.

Similarly from 29.5 parts of nitrobenzyl bromide, and from 29 parts of 4-ethoxybenzyl bromide are obtained compounds of the above structure where X is, respectively, the nitro group and the ethoxy group. In a similar way, using octadecyl bromide in equivalent molar ratio to the same substituted morpholine, there is obtained N - octadecyl - N - [3,3 - di(benzoylmethyl) - 2,2-dimethylpropyl]morpholinium bromide.

Example 2

When 35 parts of 1,1-di(benzoylmethyl)-2-(dimethylaminomethyl)-2-methylpropane are allowed to stand 48 hours with 20 parts of methyl iodide in 30 parts of acetonitrile, there is obtained on removal of solvent, a colorless solid analyzing correctly for the structure $$[(CH_3)_3NCH_2C(CH_3)_2CH(CH_2COC_6H_5)_2]I$$

Example 3

To 45 parts of 1,1-di(β-naphthoylmethyl)-2,2-dimethyl-3-dimethylaminopropane is added 31 parts of p-t-octylphenoxyethyl bromide and 40 parts of alcohol. The mixture is refluxed for 15 hours and the solvent is then removed. Then results a resinous solid which is substantially water-soluble, and corresponds to the 1:1 addition product of the two reactants.

In a similar way from the same tertiary amine and phenacyl chloride, there is obtained a salt corresponding in composition to the formula $$\left[\begin{array}{c}(CH_3)_2NCH_2C(CH_3)_2CH(CH_2COC_{10}H_7)_2\\ CH_2COC_6H_5\end{array}\right]Cl$$

Example 4

To 35 parts of 1,1-di(benzoylmethyl)-2-(dimethylaminomethyl)-2-methylpropane are added 40 parts of ethanol and 9.5 parts of chloroacetamide, and the mixture is refluxed for 10 hours. On removal of solvent, a white powder corresponding in composition to the formula $$\left[\begin{array}{c}(CH_3)_2NCH_2C(CH_3)_2CH(CH_2COC_6H_5)_2\\ CH_2COY\end{array}\right]Cl$$

where Y is —NH$_2$, is isolated.

In the same way, substituting 9.5 parts of chloroacetone for the chloroacetamide, there is obtained a white powder of the above composition where Y is —CH$_3$.

In the same way, substituting 12.5 parts of ethyl chloroacetate for the chloroacetamide, there is obtained a white powder of the above composition where Y is —OC$_2$H$_5$.

Example 5

To 39 parts of 1,1-di(p-chlorobenzoylmethyl)-2-(dimethylaminomethyl)-2-methylpropane are added 12.5 parts of dimethyl sulfate and 40 parts of alcohol. The mixture is refluxed for ten hours, and the alcohol is removed by stripping in vacuo on the steam bath. There remains a white powder, corresponding in composition to the formula $$\left[(CH_3)_3NCH_2C(CH_3)_2CH(CH_2CO\text{—}\phantom{X}\text{—}Cl)_2\right]SO_4CH_3$$

Example 6

To a solution of 59.5 parts of 1,1-di(benzoylmethyl)-2-(dimethylaminomethyl)-2-methylpropane in 38 parts of isopropyl alcohol is added dropwise at reflux 21.5 parts of benzyl chloride. After refluxing for 11 hours and cooling to room temperature, the product crystallizes and is isolated by filtration. There is then obtained 75 parts of a colorless powder, with an extremely bitter taste. Titration for chloride ion showed the material to be 93% pure (6.9% Cl⁻, theory 7.4%). It is substantially water-soluble. The product corresponds to the formula $$\left[\begin{array}{c}(CH_3)_2NCH_2C(CH_3)_2CH(CH_2CO\text{—}\phantom{X}\text{—})_2\\ CH_2C_6H_5\end{array}\right]Cl$$

Similarly, 1,1-di(p-chlorobenzoylmethyl) - 2 - (dimethylaminomethyl)-2-methylpropane is dissolved in nitromethane and allowed to react at 90° with an equivalent of dodecylbenzyl chloride. After removal of the solvent, the resulting thick oil is almost completely soluble in water and corresponds in analysis with the compound $$\left[\begin{array}{c}(CH_3)_2NCH_2C(CH_3)_2CH(CH_2CO\text{—}\phantom{X}\text{—}Cl)_2\\ CH_2C_6H_4C_{12}H_{25}\end{array}\right]Cl$$

In like manner, quaternizing with dodecenyl chloride, there is produced the compound having the formula $$\left[\begin{array}{c}(CH_3)_2NCH_2C(CH_3)_2CH(CH_2CO\text{—}\phantom{X}\text{—}Cl)_2\\ C_{12}H_{23}\end{array}\right]Cl$$

In like manner, 1,1-di(benzoylmethyl)-2-piperidinomethyl-2-methylpropane, a white solid, is reacted in equimolar quantities with phenylbutenyl chloride. There is obtained a quaternary ammonium salt analyzing correctly for the compound $$\left[\begin{array}{c}CH_2\text{—}CH_2\\CH_2\diagdown\phantom{X}\diagup NCH_2C(CH_3)_2CH(CH_2COC_6H_5)_2\\ CH_2\text{—}CH_2\phantom{XX}CH_2CH\text{=}CH_2CHC_6H_5\end{array}\right]Cl$$

By substituting the corresponding pyrrolidino compound in the above procedure there is obtained the corresponding pyrrolidine quaternary ammonium product.

In the same way, when there is substituted for the benzyl chloride, 27 parts of methallyl chloride, after 20 hours reflux and removal of the solvent, there is obtained a thick oil which is nearly entirely soluble in water. The water solution is washed with heptane and there is obtained a water solution of the compound $$\left[\begin{array}{c}(CH_3)_2NCH_2C(CH_3)_2CH(CH_2COC_6H_5)_2\\ CH_2C\text{=}CH_2\\ CH_3\end{array}\right]Cl$$

Example 7

Molecular equivalents of 1,1-di(p-ethoxybenzoylmethyl)-2,2-dimethyl-3-(dibutylamino)propane and hexynyl chloride are refluxed for 48 hours, and the product dissolved in water and extracted with heptane. There is obtained a water solution of the quaternary ammonium salt having the formula

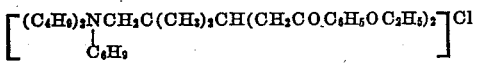

Similarly, employing, in place of hexynyl chloride, β-ethoxydecyl chloride, vinoxyethyl chloride, and hydroxyethyl chloride, there are produced quaternary ammonium compounds having the formulas

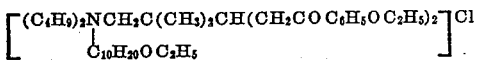

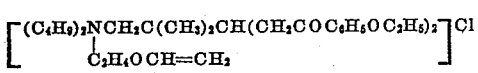

and

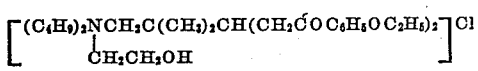

respectively.

This application is a continuation-in-part of application Serial No. 588,639, filed June 1, 1956, now abandoned.

I claim:
1. The compound having the formula

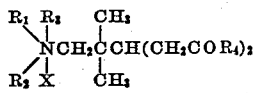

in which $R_1$ and $R_2$, taken singly, represent alkyl groups of one to four carbon atoms and, taken collectively with the nitrogen to which they are attached represent a member from the group consisting of morpholino, thiamorpholino, pyrrolidinyl, piperidino, and these groups having lower alkyl substituents on at least one of their carbon atoms, $R_3$ is a member from the class consisting of alkyl and cycloalkyl groups of one to eighteen carbon atoms, alkenyl groups of three to eighteen carbon atoms, alkynyl groups of three to eighteen carbon atoms, alkoxyalkyl and alkynyloxyalkyl groups of three to twenty carbon atoms, in which the oxygen atom is attached to a carbon atom no closer than the beta position with respect to the amino nitrogen atom, hydroxyalkyl groups of two to eighteen carbon atoms, in which the hydroxy group is no closer to the amino nitrogen atom than the beta position, alkoxyarylalkyl, aryloxyalkyl, and alkylaryloxyalkyl groups of no more than twenty carbon atoms, arylalkyl, alkylarylalkyl, and arylalkenyl groups of seven to twenty carbon atoms, arylalkyl groups of seven to twenty carbon atoms having ring substituents from the class consisting of halogeno and nitro groups, carbamoylalkyl groups of two to eighteen carbon atoms, an alkoxycarbonylalkyl group of three to twenty-four carbon atoms, and alkylcarbonylalkyl and arylcarbonylalkyl groups of three to twenty-four carbon atoms, said aryl groups in all instances being members from the class consisting of phenyl and naphthyl groups, $R_4$ is a member from the class consisting of aryl and substituted aryl groups in which the substituents are members from the class consisting of alkyl, alkenyl, halogeno, alkoxy, and alkoxyalkyl groups, said $R_4$ containing from six to about twelve carbon atoms, and X is an anion.

2. The compound having the formula

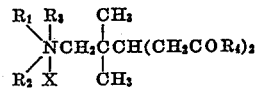

in which $R_1$ and $R_2$ are alkyl groups of one to four carbon atoms, $R_3$ is alkyl of one to eighteen carbon atoms, $R_4$ is phenyl, and X is an anion.

3. The compound having the formula

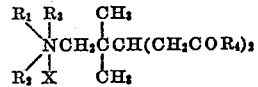

in which $R_1$ and $R_2$ are alkyl groups of one to four carbon atoms, $R_3$ is benzyl, $R_4$ is phenyl, and X is an anion.

4. The compound having the formula

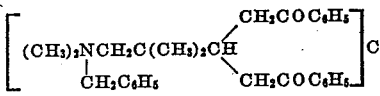

in which said $C_6H_5$ represents phenyl.

5. The compound having the formula

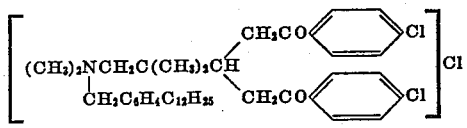

in which said $C_6H_4$ represents p-phenylene and said $C_{12}H_{25}$ represents dodecyl.

6. The compound having the formula

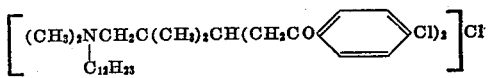

in which said $C_{12}H_{23}$ represents dodecenyl.

7. The compound having the formula

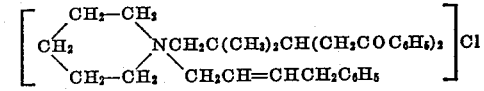

in which said $C_6H_5$ represents phenyl.

8. The compound having the formula

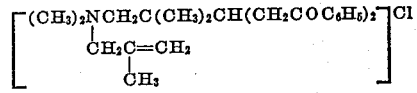

in which said $C_6H_5$ represents phenyl.

References Cited in the file of this patent
UNITED STATES PATENTS 2,198,260    Van Melsen           Apr. 23, 1940
2,721,220    Cavallito             Oct. 18, 1955

OTHER REFERENCES

Mannich et al.: Chem. Ab., vol. 28 (1934), p. 477.